United States Patent Office 3,033,668
Patented May 8, 1962

3,033,668
METHOD FOR INHIBITING NITRIFICATION OF AMMONIUM NITROGEN IN SOIL
Beverly J. Watkins, Long Beach, Calif., assignor to The Dow Chemical Company, Midland, Mich., a corporation of Delaware
No Drawing. Filed Mar. 27, 1958, Ser. No. 724,272
8 Claims. (Cl. 71—1)

The present invention relates to crop culture and is particularly concerned with a new agronomical practice and composition for conserving soil nitrogen, for supplying the plant growth media with nitrogen requirements for plant nutrition, and for improving soil for the growth of plants.

In crop culture, the condition and quality of soil is of utmost importance. Since nitrogen is necessary for plant growth and since the majority of plants obtain most or all of their nitrogen requirements from the soil, an adequate provision of nutrient nitrogen for plant growth must be made in the soil. Furthermore, it is necessary to provide favorable soil environment around plant roots such as freeing the soil from soil-dwelling nematodes, etc.

The provision of supplying nutrient nitrogen is one of the foremost agronomic problems. The nitrogen in the soil is found to occur primarily in three forms: organic nitrogen, ammonium nitrogen and nitrate nitrogen, of which ammonium nitrogen and nitrate nitrogen are the primary forms utilized by plants. This nitrogen is absorbed by plants in solution from the soil in the form of ammonium ions and nitrate ions.

The organic nitrogen in the soil consists of a large number of compounds and originates from manure, crop residues, organic fertilizers or bacterial syntheses. Since with the exception of the organic reduced nitrogen fertilizers such as urea, the solubility of these compounds in water is very low, they are not readily leached from the soil, but neither are they directly available to the plants for use. In order to be available to the plants, the nitrogen in the organic compounds must be converted by soil bacteria to ammonia or inorganic ammonium salts. This conversion, when from organic reduced nitrogen fertilizers such as urea, takes place very rapidly, but very slowly when from other organic nitrogen compounds. Following the conversion, the ammonium nitrogen is very rapidly oxidized by soil bacteria to inorganic nitrate nitrogen. In this process, the ammonium nitrogen is first oxidized to the intermediate nitrite nitrogen which is then rapidly oxidized to nitrate nitrogen. This mineralization of organic nitrogen constantly replenishes the soil with nitrogen available for plant absorption.

The ammonium nitrogen in the soil is derived from bacterial conversion of organic nitrogen or from the added reduced nitrogen fertilizers such as anhydrous ammonia, aqueous ammonia, ammonium phosphate, ammonium nitrate and ammonium sulfate. These ammonium compounds or inorganic reduced nitrogen compounds are readily soluble in water or aqueous soil medium. When in solution, the reduced nitrogen occurs largely as the ammonium ion. Due to the cationic nature of this ion, the ion is strongly adsorbed on the soil colloids or base exchange complex of the soil. This colloidal-bound ammonium nitrogen exists in equilibrium with a small concentration of ammonium ions in the soil solution. Thus, the colloidal-bound ammonium nitrogen provides a dynamic nitrogen reservoir to maintain a supply of ammonium ions in the soil solution for plant adsorption. Further, since the ammonium nitrogen in the soil occurs principally as colloidal-bound nitrogen, only very small quantities of the ammonium form of soil nitrogen are lost from the feeding zone of the plants by leaching.

The nitrate nitrogen in the soil is derived from the oxidation or nitrification of ammonium nitrogen by soil bacteria, or by the addition of inorganic nitrate fertilizers such as ammonium nitrate, sodium nitrate, potassium nitrate and calcium nitrate. The inorganic nitrate compounds are readily soluble in water and the aqueous soil medium. When so dissolved, the nitrate nitrogen largely exists as the nitrate ion. Because of the anionic nature of this ion, nitrate nitrogen is not adsorbed by soil colloids. Accordingly, the nitrate nitrogen is rapidly leached by rainfall and irrigation and readily lost from the feeding zone of the plants. Further, the nitrate nitrogen is reduced by many soil bacteria to nitrogen gas. The latter process is known as denitrification and accounts for an additional loss of large quantities of nitrate nitrogen from the soil. The yearly loss from leaching and denitrification amounts to from 20 to 80 percent of the nitrate nitrogen found in the soil, whatever its source.

Nitrification or the conversion of the ammonium nitrogen in soil to nitrate nitrogen by bacterial action occurs at a rate which is dependent primarily upon the soil temperature and the soil pH. The rate is also somewhat dependent upon the type of soil and the moisture content of the soil. The rate of nitrification is rapid when the soil temperature is at least 10° C. and the soil pH is at least 5. For example, the conversion of ammonium nitrogen to nitrate nitrogen in sand, silt or clay loam soil having a pH of at least 6 may take place at a rate of from 20 pounds of nitrate nitrogen per acre per week at 10° C., to 500 pounds of nitrate nitrogen per acre per week at 35° C. Even at temperatures as low as 2° C., nitrification will oftentimes occur in such soils at a rate of 25 pounds of nitrate nitrogen per month. Thus, ammonium nitrogen is very rapidly changed to nitrate nitrogen in most agricultural soils.

The tremendous losses of soil nitrogen resulting from the rapid nitrification of ammonium nitrogen, and the leaching and bacterial decomposition of nitrate nitrogen have depleted many agricultural soils of the nitrogen reserves and nitrogen requirements for plant nutrition. In order to replenish the soil nitrogen, the agriculturalist has resorted to the use of large amounts of nitrate fertilizers and reduced nitrogen fertilizers. In many instances, multiple fertilizer treatments during the growing season have been required to maintain adequate nitrogen requirements for plant growth. In this practice, the greater proportion of the employed fertilizers is in the form of reduced nitrogen fertilizers. By the expression "reduced nitrogen fertilizers" is meant fertilizers containing nitrogen in the reduced state and is inclusive of ammonium salts, ammonia, and water-soluble organic compounds readily convertible in soil to ammonia or ammonium ions such as urea and cyanamide.

Since the nitrogen must be present as nitrate nitrogen before substantial quantities can be leached from the soil or lost by denitrification, the application of nitrogen as reduced nitrogen fertilizers provides the agriculturalist with a short interval during which available reduced nitrogen is at a maximum and conditions for leaching and denitrification are at a minimum. This interval is particularly advantageous during the initial growth of seeds and emerging seedlings when high soil nitrogen concentrations are very desirable. In addition, the ammonium nitrogen absorbed by plants is immediately available for assimilation into organic materials being synthesized thereby. In contrast, the nitrate nitrogen must be reduced before it can be assimilated in the synthesis of plant materials. This reduction is carried out in the plant usually at the expense of synthesized carbohydrate. Although some plants seem to do well on either ammonium nitrogen or nitrate nitrogen as a source of nitrogen nutrients, many plants such as potato, corn, rice, buckwheat, pineapple, cotton and orange prefer ammonium nitrogen and appear to grow best on this form of nitrogen. Thus, the need for a method of suppressing the rapid loss of soil nitrogen is well recognized by the agriculturalists.

An object of the present invention is to provide a new method and composition for improving soil for plant growth. A further object is the provision of a new and improved method for conserving soil nitrogen. An additional object is the provision of a new and improved method for suppressing the loss of ammonium nitrogen from soil. Another object is the provision of a new and improved method for supplying soil with nitrogen available for plant growth. Another object is the provision of a new and improved method for suppressing the loss of reduced nitrogen fertilizer supplements from soil. An additional object is the provision of a new and improved method for suppressing the nitrification of ammonium nitrogen in soil. Another object is the provision of a new and improved method for suppressing the conversion in soil of ammonium ions to nitrate ions. An additional object is the provision of a method for improving soil environment of plant roots by the fumigation and disinfection of soil infested with nematodes and fungi which attack plant roots. Other objects will become apparent from the following specification and claims.

The new agronomical practice for improving plant nutrition and growth and conserving soil nitrogen comprises treating plant growth media with an acetylenic alcohol having the formula

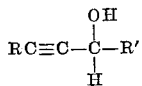

where R is hydrogen or methyl and R' is alkyl having from 1 to 8 carbon atoms, alkenyl having from 2 to 8 carbon atoms, alkynyl having from 2 to 8 carbon atoms, mono- and polychloro-lower-alkyl, phenyl, lower alkyl- and lower-alkoxyphenyl, aralkyl, hydroxyphenyl, chlorophenyl, cinnamyl, dimethylaminophenyl, cyclohexenyl, furfuryl or tetrahydrofurfuryl. Examples of radicals represented by R' include methyl, ethyl, isopropyl, tertiary-butyl, isoamyl, normal-hexyl, 4,4-dimethylpentyl, normal-octyl, alkyl, vinyl, crotyl, 1-ethyl-penten-1-yl, 1-methyl-hexen-1-yl, 1-propenyl, isopropenyl, propargyl, octen-3-yl, hexyn-1-yl, hexyn-3-yl, chloromethyl, dichloromethyl, trichloromethyl, α,α-dichloroethyl, α,β-dichloropropyl, 4-methylphenyl, 3-ethylphenyl, 3-hydroxyphenyl, 2-methoxyphenyl, 4-isopropoxyphenyl, hydrocinnamyl, phenethyl, benzyl, 3 - cyclohexen-1-yl, 2-hydroxyphenyl, 4-hydroxyphenyl, 2-chlorophenyl, 3-chlorophenyl and 4 - chlorophenyl. The acetylenic alcohols are colorless or light yellow liquids or low melting solids which are adapted to be readily and conveniently distributed in soil. By the practice of this invention, the nitrification of ammonium nitrogen in the soil to nitrate nitrogen is suppressed thereby preventing the rapid loss of ammonium nitrogen from the soil. Furthermore, by proper distribution, this action of inhibiting the transformation of ammonium nitrogen to nitrate nitrogen is effective over a prolonged period of time. The ammonium nitrogen may arise from added ammonium nitrogen fertilizers or be formed in the soil by conversion of the organic nitrogen constituents found in soil or added thereto as components of organic fertilizers. By the expression "ammonium nitrogen fertilizers" is meant anhydrous and aqueous or aqua ammonia as well as the ammonium salts. In addition, by the practice of this invention, the control of soil inhabiting organisms such as rootknot nematodes, sugar beet nematodes and fungi may be achieved.

The provision of an effective dosage of the acetylenic alcohol in the soil or growth medium or dosage sufficient to suppress nitrification or control soil dwelling organisms (parasiticidal dosage) is essential for the practice of the present invention. In general, good results are obtained when the growth medium is supplied with the compounds in the amount of from 2 to 150 parts or more by weight per million parts by weight of medium. The preferred amount is considered to be from 5 to 50 parts by weight per million parts by weight of soil. In field applications, the compounds may be distributed in the soil in the amount of at least 0.25 pound per acre and through such cross-section of the soil as to provide for the presence therein of an effective concentration of the agent. It is usually preferred that the compounds be distributed to a depth of at least 2 inches below the soil surface and at a dosage of at least 0.5 pound per acre inch of soil. By dispersing very large dosages in growth media, a prolonged inhibition of nitrification may be obtained over a period of many months. Such application also provides more favorable growth media by freeing the soil from the organisms attacking plants and plant roots and contributing to adverse effects on plant growth. The concentration of the active compounds is eventually reduced to a minimum by decomposition in the soil.

In one embodiment of the present invention, the acetylenic alcohol is distributed throughout the growth media prior to seeding or transplanting the desired crop plant.

In another embodiment, the soil in the root zone of growing plants is treated with the acetylenic alcohol in an amount sufficient to inhibit nitrification and free the soil of nematodes and fungi but sublethal to plant growth. In such operations, the compounds should be supplied in the soil in an amount no greater than about 250 parts by weight per million parts by weight of the soil. By following such practice, no adverse effect is exerted by the compounds upon growth of seeds or plants. Oftentimes it is desirable to treat the soil adjacent to plants, and this procedure may be carried out conveniently in side-dressing operations.

In a further embodiment, soil may be treated with the acetylenic alcohols following harvest, or after fallowing to free soil of plant attacking organisms, to prevent rapid loss of ammonium nitrogen and to build up the ammonium nitrogen formed by conversion of organic nitrogen compounds. Such practice provides favorable growth media and conserves the soil nitrogen for the following growing season.

In an additional embodiment, the soil is treated with the acetylenic alcohols in conjunction with the application of reduced nitrogen fertilizers. The treatment with the acetylenic alcohols may be carried out prior to, subsequent to or simultaneously with the application of fertilizers. Such practice prevents the rapid loss of the ammonium nitrogen added as fertilizer and the ammonium nitrogen formed from the organic reduced nitrogen in fertilizers by the action of soil bacteria. The administration to the soil of the acetylenic alcohols in an ammonium nitrogen fertilizer composition constitutes a preferred embodiment of the present invention.

The present invention may be carried out by distributing the acetylenic alcohols in an unmodified form through growth medium. The present method also embraces distributing the compound as a constituent in liquid or finely divided solid compositions. In such practice, the acetylenic alcohols may be modified with one or more additaments or soil treating adjuvants including water, petroleum distillates or other liquid carriers, surface-active dispersing agents, finely divided inert solids and nitrogen fertilizers. Depending upon the concentration of the compounds, such augmented compositions may be distributed in the soil without further modification or be considered concentrates and subsequently diluted with additional inert carrier to produce the ultimate treating compositions.

The required amount of the compounds may be supplied to growth media in from 1 to 50 gallons of organic solvent carrier, in from 1 to 27,000 or more gallons of aqueous carrier or in from about 10 to 2,000 pounds of solid carrier per acre treated.

The concentration of the compounds in compositions to be employed for the treatment of growth media is not critical and may vary considerably provided the required dosage of effective agent is supplied thereto. The concentration of the acetylenic alcohol may vary from 0.001 percent by weight to 95 percent by weight of the composition, depending on whether the composition is a soil treating composition or a concentrate composition and whether it is in the form of a solid or a liquid. In aqueous liquid treating compositions, concentrations of from 0.001 percent to 10 percent by weight of the acetylenic alcohol is considered the preferred composition. The concentration of the acetylenic alcohol in organic solvents may be from 2.0 to 90 percent by weight. Solid compositions generally contain from 5 to 50 percent by weight of the acetylenic alcohol. Treating compositions usually contain 0.004 percent to 10 percent by weight of the acetylenic alcohol. In compositions to be employed as concentrates, the acetylenic alcohol is oftentimes present in a concentration of from 2.5 to 95 percent by weight.

Liquid compositions containing the desired amount of the compounds may be prepared by dispersing the agents in one or more liquid carriers such as water and organic solvents with or without the aid of a suitable surface-active dispersing agent or emulsifying agent. Suitable organic solvents include acetone, diisobutylketone, methanol, ethanol, isopropyl alcohol, diethyl ether, toluene, methylene chloride, chlorobenzene and the petroleum distillates. The preferred organic solvents are those which are of such volatility that they leave little permanent residue in the soil. When the solutions of active compounds in organic solvents are to be further diluted to produce aqueous dispersions, the preferred solvents include acetone and the alcohols. When the liquid carrier is entirely organic in nature, particularly desirable carriers are the petroleum distillates boiling almost entirely under 400° F. at atmospheric pressure and having a flash point above about 80° F. Dispersing and emulsifying agents which may be employed in liquid compositions include condensation products of alkylene oxides with phenols and organic acids, alkyl aryl sulfonates, polyoxyalkylene derivatives of sorbitan esters, complex ether alcohols, mahogany soaps and the like. The surface-active agents are generally employed in the amount of from 1 to 20 percent by weight of the combined weight of acetylenic alcohol and surface-active agent.

Solid compositions containing the active acetylenic alcohols may be prepared by dispersing the compounds in finely divided inert solid carriers such as talc, chalk, gypsum, vermiculite, bentonite and the like, fuller's earth, attapulgite and other clays, various solid detergent dispersing agents and solid fertilizer compositions. In preparing such compositions, the carrier is mechanically ground with the acetylenic alcohol or wet with a solution thereof in a volatile organic solvent. Depending upon the proportions of ingredients, these compositions may be employed without further modification or be considered concentrates and subsequently further diluted with solid surface-active dispersing agent, talc, chalk, gypsum or the like to obtain the desired treating composition. Furthermore, such concentrate compositions may be dispersed in water with or without added dispersing agent or agents to prepare aqueous soil treating compositions.

Soil treating compositions may be prepared by dispersing the acetylenic alcohol in fertilizers such as ammonium fertilizer or organic nitrogen fertilizer. The resulting fertilizer compositions may be employed as such or may be modified such as by dilution with additional nitrogen fertilizer or with inert solid carrier to obtain a composition containing the desired amount of active agent for treatment of soil. Further, an aqueous dispersion of the acetylenic alcohol fertilizer composition may be prepared and administered to the growth medium. Fertilizer compositions comprising the acetylenic alcohol in intimate admixture with ammonium fertilizers constitute preferred embodiments of the present invention. In fertilizer compositions comprising a reduced nitrogen fertilizer, it is desirable that the acetylenic alcohol be present in an amount of at least 0.5 percent by weight based on the weight of the nitrogen present in the fertilizer as reduced nitrogen. Thus, when a fertilizer composition contains both reduced nitrogen and other forms of nitrogen such as in the case of ammonium nitrate fertilizer compositions, the amount of the acetylenic alcohol is based on the weight of the nitrogen present in the ammonium component.

In operations carried out in accordance with the present invention, the soil may be impregnated in any convenient fashion with the active compounds or a composition containing these agents. For example, these modified or unmodified compositions may be simply mechanically mixed with the soil, applied to the surface of soil and thereafter dragged or disced into the soil to a desired depth; transported into the soil with a liquid carrier such as by injection, spraying or irrigation. When the distribution is carried out by introducing the compounds in the water employed to irrigate the soil, the amount of water is varied in accordance with the moisture content of the soil in order to obtain a distribution of the compounds to the desired depth. The compounds may be readily and conveniently distributed to a depth of from two to four feet by irrigation methods. The preferred methods embrace procedures using any of these steps wherein the compounds are distributed in the soil substantially simultaneously with a reduced nitrogen fertilizer.

The following examples illustrate the invention but are not to be construed as limiting.

EXAMPLE 1

An aqueous ammonium fertilizer composition containing 500 parts by weight of nitrogen and 50 parts by weight of an acetylenic alcohol per million parts of aqueous medium was prepared by dispersing a 4 percent (by weight of volume of solvent) acetone solution of acetylenic alcohol in aqueous ammonium sulfate solution. (The amount of nitrogen in all examples is based on the nitrogen present in the fertilizer in the reduced form.)

The composition so prepared was employed to treat seed beds prepared from sandy loam soil having a pH of about 8, containing essentially no organic material, and having been freed of nitrite and nitrate nitrogen by prior thorough leaching. In the treating operation, the composition was applied to the seed beds as a soil drench, and the soil in the beds thoroughly mixed to insure a substantially uniform distribution of the composition throughout the soil. The amount of the composition employed was sufficient to 100 parts by weight of nitrogen and 10 parts by weight of the acetylenic alcohol per million parts by weight of soil. In a check operation, other seed beds prepared from soil were freed of nitrate and nitrite nitrogen, containing substantially no organic material and having a pH of about 8 were fertilized with a similar aqueous fertilizer composition containing the same amount of acetone and ammonium sulfate but omitting the acetylenic alcohol compound. The latter composition was applied in an amount sufficient to supply the same concentration of nitrogen to the soil as the treating composition containing an acetylenic alcohol. Following the distribution, the beds were covered and the soil temperature remained at about 70° F. for the period of determination.

At one week and two week intervals following the treatment, samples of soil were taken from the different seed beds and the extent of nitrification of the added ammonium sulfate fertilizer determined by analyses for nitrate+nitrite nitrogen. The determinations were carried out by extracting the nitrate and nitrite from the soil with saturated calcium sulfate solution, developing color in the clear supernatant of the extract with diphenylamine in sulfuric acid and comparing the color with a standard solution containing known concentrations of nitrate and nitrite ions. This procedure is similar to that described in "Colorimetric Methods of Analysis" by F. D. Snell and C. T. Snell, D. Van Norstrand Company, Inc., volume II, 3rd edition, page 801.

The percent nitrification of the added ammonium sulfate in the various treating compositions at various intervals is set forth in Table I.

Table I

| Treating Composition | Percent Nitrification | |
|---|---|---|
|  | One Week Following Treatment | Two Weeks Following Treatment |
| Ammonium sulfate + 4-hexene-1-yn-3-ol | 5 | 5 |
| Ammonium sulfate + 4-methyl-1-pentyn-3-ol | 5 | 5 |
| Ammonium sulfate + 1-pentyn-3-ol | 5 | 5 |
| Ammonium sulfate + 3-butyn-2-ol | 5 | 5 |
| Ammonium sulfate (check) | 100 | 100 |

EXAMPLE 2

An experiment was carried out in a manner similar to that described in Example 1 with other acetylenic alcohols. The degrees of nitrification were determined after an interval of one week following treatment. A check operation was carried out simultaneously with a composition containing no acetylenic alcohol. The results of these determinations are given in Table II.

Table II

Percent nitrification one week following treatment

Treating composition:
  Ammonium sulfate+4-ethyl-4-octen-1-yn-3-ol__ 15
  Ammonium sulfate+1-penten-4-yn-3-ol_____ 15
  Ammonium sulfate+2-methyl-1-penten-4-yn-3-ol _____ 15
  Ammonium sulfate+1-hexyn-3-ol_____ 5
  Ammonium sulfate (check)_____ 100

EXAMPLE 3

An aqueous ammonium fertilizer composition containing 1000 parts by weight of nitrogen and 50 parts by weight of an acetylenic alcohol per million parts of aqueous medium was prepared as described in Example 1. The composition so prepared was employed to treat seed beds prepared from sandy loam soil having a pH of about 8 being freed of organic material and nitrite and nitrate nitrogen as previously described. The composition was applied to the seed beds as a soil drench and the soil in the beds thoroughly mixed to insure substantially uniform distribution of the composition throughout the soil. The amount of the composition employed was sufficient to supply 200 parts by weight of nitrogen and 10 parts by weight of the acetylenic alcohol per million parts by weight of soil. In a check operation, other seed beds prepared from similar soil were fertilized with an aqueous fertilizer composition containing the same amount of acetone and ammonium sulfate but lacking the acetylenic alcohol. The latter composition was applied in an amount sufficient to supply the same amount of nitrogen to the soil as the treating composition containing an acetylenic alcohol. Following the distribution, the seed beds remained at a temperature of about 70° F. for a period of determination.

At various intervals following the treatment, samples of soil were taken from different seed beds and the extent of nitrification of the added ammonium sulfate fertilizer was determined by analyses for nitrate+nitrite nitrogen as described in Example 1. Percent nitrification of the added ammonium sulfate in the various treating compositions at various intervals is set forth in Table III.

Table III

| Treating Composition | Interval Following Treatment in Weeks | Percent Nitrification |
|---|---|---|
| Ammonium sulfate + α-ethynyl benzyl alcohol | 1 | 10 |
| Ammonium sulfate + 1-phenyl-1-penten-4-yn-3-ol | 1 | 20 |
| Ammonium sulfate + α-ethynyl furfuryl alcohol | 1 | 10 |
| Do | 2 | 10 |
| Ammonium sulfate + 4-methyl-1-pentyn-3-ol | 1 | 10 |
| Do | 2 | 5 |
| Ammonium sulfate + 5-phenyl-1-pentyn-3-ol | 1 | 20 |
| Ammonium sulfate + 1,1,1-trichloro-3-butyn-2-ol | 1 | 10 |
| Do | 2 | 10 |
| Ammonium sulfate + α-ethynyl-3-cyclohexene-1-methanol | 1 | 10 |
| Ammonium sulfate + α-ethynyl anisyl alcohol | 1 | 20 |
| Ammonium sulfate + p-dimethyl-amino-α-ethynyl benzyl alcohol | 1 | 37 |
| Ammonium sulfate + α-ethynyl saligenin | 1 | 37 |
| Ammonium sulfate + p-chloro-α-ethynyl benzyl alcohol | 1 | 20 |
| Ammonium sulfate (check) | 1 | 100 |
| Do | 2 | 100 |

EXAMPLE 4

An aqueous ammonium fertilizer composition containing 1820 parts by weight of nitrogen and 360, 180 and 90 parts by weight of 3-butyn-2-ol per million parts of aqueous medium was prepared by dispersing a 4 percent acetone solution of 3-butyn-2-ol in an aqueous ammonium sulfate solution.

The composition so prepared was employed to treat seed beds of sandy loam soil prepared as described in the previous examples. The seed beds were divided into small plots by pressing metal rings of approximately 4 inches in diameter into the soil to a depth of 3½ inches leaving a 1-inch band above ground for water retention. The above composition was then applied thereto as a soil drench at a rate to supply 980 pounds of ammonium sulfate per acre (or 205 pounds of nitrogen per acre) and 40, 20, 10 and 0 pounds, respectively, of 3-butyn-2-ol per acre. The application of the acetylenic alcohol and fertilizer compositions were immediately followed by the application of an amount of water to provide for 1 acre inch of water. During the following five weeks, an additional 3½ inches of water was applied in two scheduled 1-inch irrigations at weekly intervals followed by natural rainfall at irregular intervals. The seed beds received a total of 4½ inches of irrigation during the treating operation.

About 40 days after the application of the treating compositions, samples of soil were withdrawn, and the ammonia content was determined by a Kjeldahl distillation using magnesium oxide to drive off the mineral ammonia and collecting the latter in boric acid. From the amount of recovered ammonia, the percent nitrification was calculated. The results are given in Table IV.

Table IV

Concentration of 3-butyn-2-ol expressed as pounds/acre:

Percent nitrification
  40 _____ 14
  20 _____ 25
  10 _____ 46
   0 (check) _____ 88

EXAMPLE 5

A soil fertilizer composition is prepared as follows:
(1) An inhibitor component is prepared by (a) mixing and grinding together with 0.2 gram of 3-butyn-2-ol and 0.3 gram of attapulgite, (b) adding 5 grams of pyrophyllite thereto and grinding the resulting mixture until a finely powdered uniform composition is obtained;

(2) A fertilizer component is prepared by hammer-milling together a 50–50 mixture by weight of ammonium sulfate and pyrophyllite to obtain a fine uniform composition;

(3) The inhibitor component and fertilizer component are mixed together on a roller mill to obtain a soil treating composition containing 3-butyn-2-ol in a concentration of 5 percent by weight of nitrogen in the treating composition.

This composition is employed to fertilize various beds of sandy loam soil containing essentially no organic material and having a pH of about 8. The soil employed is previously leached to remove the nitrite and nitrate nitrogen constituents. A sufficient amount of water is added to the beds to give the soil a moisture content of 20 percent. The beds are fertilized in areas to be planted by providing depressions and adding thereto the fertilizer treating composition and then covering the composition with soil. The amount of composition employed is sufficient to supply 160 parts by weight of nitrogen per million parts by weight of soil. The soil is maintained in the temperature range of from 70° to 85° F. for three weeks. At the end of this period, samples of soil are analyzed for content of nitrate+nitrite nitrogen to determine the extent of nitrification of the added ammonium sulfate. A check operation is simultaneously carried out wherein no 3-butyn-2-ol was added to the treating composition. It is found that the soil treated with a fertilizer composition containing 3-butyn-2-ol has substantially no nitrification whereas the soil treated with a fertilizer composition containing no acetylenic alcohol has 100 percent nitrification.

EXAMPLE 6

Concentrate compositions are prepared as follows:

(A) 25 parts by weight of 1,5-hexadiyn-3-ol, 65 parts of xylene and 10 parts of an alkylated aryl polyether alcohol (Triton X–100) are mechanically mixed together to obtain an emulsifiable liquid composition.

(B) 90 parts by weight of 7-octen-1-yn-3-ol and 10 parts of an alkyl aryl sulfonate (Acto 700) are mechanically mixed together to obtain a water-dispersible mixture.

These compositions may be dispersed in water to produce aqueous compositions having desirable wetting and penetrating properties. These aqueous compositions are then employed to treat soil in an amount sufficient to distribute the acetylenic alcohol therein in effective concentrations. The concentrates may also be dispersed in aqua ammonia to prepare fertilizer compositions.

EXAMPLE 7

Fertilizer compositions are prepared as follows:

(A) Oct-1-yn-3-ol is mechanically mixed in separate portions with ammonium phosphate to prepare reduced nitrogen fertilizer compositions containing 5 percent by weight of the acetylenic alcohol.

(B) 1,1-dichloro-3-butyn-2-ol is mechanically mixed in separate portions with ammonium nitrate to prepare reduced nitrogen fertilizer compositions containing 3 percent by weight of 1,1-dichloro-3-butyn-2-ol.

(C) 1-phenyl-1-hexen-yn-3-ol is mechanically mixed in separate portions with urea to prepare reduced nitrogen fertilizer compositions containing 2 percent by weight of the acetylenic alcohol.

These fertilizer compositions are distributed in soil to supply the nitrogen requirements for plant nutrition. The treated soil is resistant to nitrification and provides nitrogen available for plant growth over a prolonged period of time.

EXAMPLE 8

An aqueous soil treating composition containing 100 parts by weight of 1-chloro-3-butyn-2-ol, 1000 parts by weight of nitrogen as ammonium sulfate and 500 parts by weight of phosphorus as phosphoric acid is prepared by dispersing a 4 percent (weight per volume of solvent) acetone solution of 1-chloro-3-butyn-2-ol into an aqueous solution of ammonium sulfate and phosphoric acid.

Pots are prepared for planting with 500 grams of sandy loam soil having a pH of 8 and a 4 percent moisture content. 200 milliliters of the treating composition prepared as described above is poured over the soil (an amount equal to about 1 inch of liquid) to supply to the soil 1-chloro-3-butyn-2-ol in an amount sufficient to give a concentration of 40 parts by weight per million parts by weight of soil and a concentration of nitrogen of 400 parts per million. The treated soil is then covered with paper to reduce evaporation and maintained in the temperature range of from 70° to 80° F.

After a period of six weeks, the soil in the pots is leached with 6 inches of water and thereafter planted with three species. Each pot is planted with four tomato plants, five milo plants and a thick stand of rye. After an appropriate growth interval, the tops of the plants are harvested just above ground level and weighed. The average fresh weight in grams per pot is determined at the time of harvest which was 35 days for tomato plants, 46 days for milo plants and 47 days for rye plants and compared with the average fresh weight of plant tops in a check operation carried out simultaneously wherein soil in pots is similarly fertilized with a composition containing the same amount of ammonium sulfate, phosphoric acid and acetone but no 1-chloro-3-butyn-2-ol. On comparing the fresh weights, it is found that the weight of the plant tops at harvest of plants grown in the treating operations are about four times that of the plant grown in the check operations.

EXAMPLE 9

3-butyn-2-ol was employed for the treatment of sandy loam soil heavily infested with the fungus organisms *Fusarium solani*, Pythium spp. and *Rhizoctonia solani*. In the treating operations, the soil was placed in sealable containers and separately injected with an acetone solution containing 1.1 grams of the 3-butyn-2-ol compound per liter of ultimate mixture and in an amount sufficient to supply five parts by weight of the compound per million parts by weight of soil. The containers were then sealed and the soil therein mechanically mixed to insure uniform distribution of the composition. After mixing, the containers of treated soil were incubated at an average temperature of 25° C. In a check operation, sandy loam soil, infested but untreated, was exposed to the same conditions as the treated soil.

After three days, the containers were opened and portions of the treated and untreated soil cultured by the dilution plate method as described by J. P. Martin in Soil Science, 69, No. 3, pp. 215–32 (March 1950), to determine the percent control of fungus organisms. In the latter operations, the culturing medium employed was a peptone dextrose agar (1000 milliliters of water, 10 grams of dextrose, 5 grams of peptone, 1 gram of potassium dihydrogen phosphate, 0.5 gram of magnesium sulfate-heptahydrate and 20 grams of agar) containing 0.069 gram of rose bengal and 0.03 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for three days at 25° C.

After incubation, the plates were examined and counts of fungal colonies made in order to determine the percent control of the test organisms. The examination showed an 82 percent control of the complex of root-rot fungi. At the time of the examination, the untreated check plates were found to support the growth of very many colonies of the named test organisms.

EXAMPLE 10

Various acetylenic alcohols were employed in a determination as described in the preceding example. In the determination, the soil employed was a sandy loam heavily infested with the orgnisms *Fusarium solani*, *Pythium spp.* and *Rhizoctonia solani*. The treating, mixing, culturing and incubating operations were carried out as previously described. The compositions employed in the treating operations were acetone solutions containing 5.5 grams of one of the alcohol compounds per liter of ultimate mixture. These compositions were employed in an amount sufficient to supply 25 parts by weight of one of the alcohol compounds per million parts by weight of soil.

After three days' incubation, the plates were examined and counts of fungal colonies made in order to determine the percent control of the root-rot organisms. The results are set forth in the following Table V.

Table V

| Treating compound: | Percent control of the complex of root-rot fungi |
|---|---|
| 3-butyn-2-ol | 98 |
| 1-pentyn-3-ol | 83 |
| 1-hexyn-3-ol | 93 |
| 4-hexen-1-yn-3-ol | 98 |
| 1-penten-4-yn-3-ol | 95 |
| 2-methyl-1-penten-4-yn-3-ol | 95 |
| 5-phenyl-1-pentyn-3-ol | 90 |
| α-Ethynyl-benzyl alcohol | 95 |

At the time of the observations, the untreated check plates were found to support the growth of numerous colonies of the named fungus organisms.

EXAMPLE 11

Seventy parts by weight of 3-butyn-2-ol, 6 parts of Atlox 4600 (a blend of alkyl aryl sulfonate with polyoxyethylene sorbitan ester of mixed fatty acids) and 4 parts of Atlox 4500 (a blend of alkyl aryl sulfonate with polyoxyethylene sorbitan ester or mixed fatty acids) were dispersed in toluene to prepare an emulsifiable concentrate composition containing 70 grams of 3-butyn-2-ol per 100 milliliters of ultimate mixture. This concentrate composition was dispersed in water to prepare a soil treating composition containing 214 parts by weight of 3-butyn-2-ol per million parts by weight of aqueous composition. The aqueous composition was employed for the treatment of areas of sandy loam soil containing a very heavy infestation of root-knot nematodes. In the treating operations, the composition was applied to the soil areas as a soil drench and at a rate of about 2 acre inches of aqueous composition per acre to supply about 100 pounds of 3-butyn-2-ol per acre. Other areas of the same infested soil were left untreated to serve as checks.

About seven days after treatment, samples of soil were taken from the areas at a depth of about 3 inches below the soil surface and the soil samples planted with the seeds of cucumbers. Five weeks after seeding, the emerged plants were lifted from the soil and their roots washed and thereafter examined for gall formation attributable to nematode attack to determine the percent control of nematodes. The observations showed that a 98 percent control of nematodes had been obtained in the treated soil. In the check plots which received no treatment, the roots of the plants were found to be covered with galls attributable to nematode attack.

The acetylenic alcohols employed in the present invention may be prepared by reacting an appropriate aldehyde with an appropriate sodium acetylide in liquid ammonia in the temperature range of from about —40° to —60° C. for a period of from 30 minutes to several hours and thereafter recovering the product from the reaction mixture by methods well known to those skilled in the art.

I claim:
1. A method useful for inhibiting nitrification of ammonium nitrogen in soil and preventing rapid loss of ammonium nitrogen therefrom and for improving soil environment of plant roots by controlling soil dwelling fungi and nematodes which comprises impregnating soil below the soil surface in the growing area thereof with an acetylenic alcohol, said acetylenic alcohol having the formula

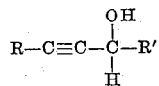

wherein R is selected from the group consisting of hydrogen and methyl and R' is selected from the group consisting of alkyl having from 1 to 8 carbon atoms, alkenyl having from 2 to 8 carbon atoms, alkynyl having from 2 to 8 carbon atoms, mono- and polychloro-lower-alkyl, phenyl, lower-alkyl- and lower-alkoxyphenyl, aralkyl, hydroxyphenyl, chlorophenyl, cinnamyl, dimethylaminophenyl, cyclohexenyl, furfuryl and tetrahydrofurfuryl, wherein the acetylenic alcohol is employed in an amount of from about 2 to about 250 parts by weight per million parts by weight of soil.

2. A method according to claim 1 wherein the acetylenic alcohol is 3-butyn-2-ol.
3. A method according to claim 1 wherein the acetylenic alcohol is 3-pentyn-2-ol.
4. A method according to claim 1 wherein the acetylenic alcohol is 3-hexyn-2-ol.
5. A method according to claim 1 wherein the acetylenic alcohol is 4-hexen-1-yn-3-ol.
6. A method according to claim 1 wherein the acetylenic alcohol is 1-pentyn-3-ol.
7. A method according to claim 1 wherein the acetylenic alcohol is employed in a soil treating adjuvant.
8. In the practice of agronomy, a method useful for inhibiting nitrification of ammonium nitrogen in soil and preventing rapid loss of ammonium nitrogen therefrom and for improving soil environment of plant roots by controlling soil dwelling fungi and nematodes which comprises impregnating field soil below the soil surface in the growing area thereof with an acetylenic alcohol, said acetylenic alcohol having the formula

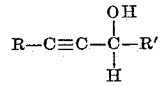

wherein R is selected from the group consisting of hydrogen and methyl and R' is selected from the group consisting of alkyl having from 1 to 8 carbon atoms, alkenyl having from 2 to 8 carbon atoms, alkynyl having from 2 to 8 carbon atoms, mono- and polychloro-lower-alkyl, phenyl, lower-alkyl- and lower-alkoxyphenyl, aralkyl, hydroxyphenyl, chlorophenyl, cinnamyl, dimethylaminophenyl, cyclohexenyl, furfuryl and tetrahydrofurfuryl, wherein said impregnation is carried out to provide a substantially uniform dosage of at least 0.25 pound per acre and through such cross-section of the soil to provide for the presence therein of from about 2 to about 250 parts by weight of the acetylenic alcohol per million parts by weight of soil.

References Cited in the file of this patent
UNITED STATES PATENTS 2,106,181 Kreimeier _____ Jan. 25, 1938
2,801,160 Iserson _____ July 30, 1957

OTHER REFERENCES

King: Insecticides and Repellants, U.S. Dept. of Agric. Handbook, No. 69, issued May 1954, pp. 93 and 255.